United States Patent Office 3,503,831
Patented Mar. 31, 1970

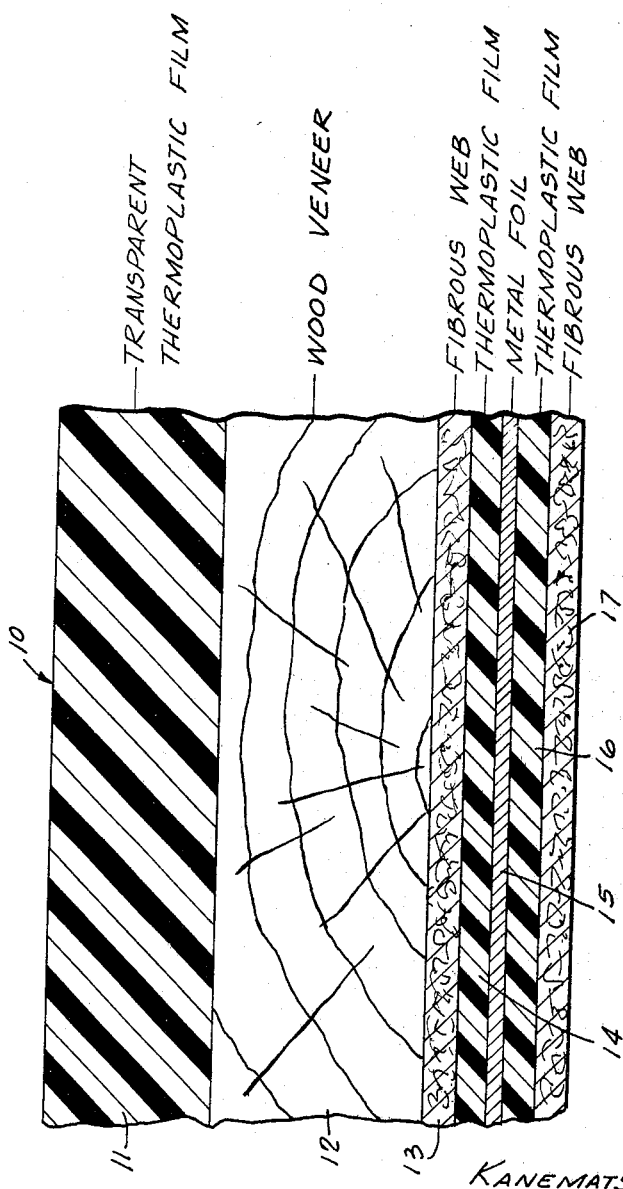

3,503,831
LAMINATED SHEET INCLUDING OUTER TRANSPARENT FILM AND A METAL FOIL ENCASED BETWEEN TWO THERMOPLASTIC FILMS
Kanematsu Oyama, 6–29 Minamisenju-machi, Arakawa-ku, Tokyo, Japan
Filed June 30, 1966, Ser. No. 561,920
Int. Cl. B32b 31/10
U.S. Cl. 161—6                               10 Claims

ABSTRACT OF THE DISCLOSURE

Laminated sheet material having an outermost film of a transparent thermoplastic resin, a sheet of wood veneer under the thermoplastic film, a sheet of fibrous web bonded to the underside of the wood veneer, a thermoplastic film bonded to the fibrous web, a metal foil bonded on one side to the first-named thermoplastic film and to a second thermoplastic film on the other side, and a fibrous web bonded to said second thermoplastic film.

---

The present invention relates to a laminated sheet material containing wood, and useful for interior decoration, particularly for the facing of furniture and cabinetry.

The laminated sheet of the present invention is waterproof and resistant to chemicals of various types. The sheet is completely flexible and easy to apply to a supporting surface, being thin and having a substantially uniform coefficient of thermal expansion in its various plies.

Laminated sheet materials consisting of wood veneer contained between layers of thermoplastic films on the one side and paper or non-woven textile fabrics on the other have been previously proposed. However, this type of product is not waterproof nor is it resistant to chemicals. Furthermore, the difference in thermal expansion between the wood veneer and the thermoplastic sheet is so great that the plies are likely to become delaminated upon large changes in temperature.

Another three-ply laminated sheet previously used consists of a sheet of wood veneer disposed between a thermoplastic sheet and a metal foil, the plies being bonded together with a suitable adhesive. However, this type of sheet frequently evidences black spots on the wood veneer corresponding, presumably, to chemical combination of tannins contained in the wood and the metal foil. Furthermore, the metal foil in this assembly frequently loses its luster due to oxidation by means of the ambient atmosphere, which also causes a decrease in the durability of the laminate. The laminated sheet of the present invention overcomes the disadvantages by providing a sheet which is waterproof, resistant to oxidation, and at the same time is non-flammable, is a good thermal insulator, and is very durable in use.

One of the objects of the invention is to provide an improved laminated structure containing wood veneer and being essentially waterproof and resistant to chemical attack.

Another object of the instant invention is to provide an improved laminated structure for facing articles, said structure being resistant to oxidation and being protected against chemical reaction with the wood veneer present.

Still a further object of the invention is to provide a laminated structure which can be made in extremely thin form and is resistant to delamination due to changes in temperature.

The laminated sheet of the present invention contains at least seven plies. The top ply consists of a transparent, thermoplastic film. This top ply is bonded by means of a suitable adhesive, either thermosetting or thermoplastic to a sheet of wood veneer. The wood veneer, in turn, is bonded to a fibrous web which may be paper or a non-woven mat of textile fibers. The fibrous web is adhesively secured on one surface to another thermoplastic film which is opaque, and preferably is colored to match the color of the wood veneer. The thermoplastic film overlies a sheet of metal foil which is bonded on its undersurface to another thermoplastic film, also opaque and preferably matching the color of the wood veneer. The bottom layer for the laminated structure is provided by another fibrous web which is either paper or a non-woven mat of textile fibers.

A further description of the present invention will be made in conjunction with the attached sheet of drawings which illustrates, in greatly magnified form, the cross-section of a laminated structure produced according to the present invention.

As shown in the drawings:

In the figure, reference numeral 10 has been applied generally to the laminated structure, and reference numeral 11 to the upper ply which consists of a transparent thermoplastic material. Generally, the thickness of this ply will be in the range from about 0.14 to 0.20 millimeter, and various transparent synthetic resins such as polyvinyl chloride, polyethylene, polypropylene, polyesters, polyvinylidene chloride, and the like can be employed. The transparent thermoplastic film 11 is adhesively bonded to a sheet of wood veneer identified at numeral 12 in the drawings. The wood veneer layer 12 can be any suitable wood species such as camphor wood, walnut, teak, birch, or the like which can be provided in thin sheets by peeling or otherwise cutting a thin veneer from a log. Generally, the thickness of the wood veneer sheet will be on the order of 0.2 millimeter.

On the underside, the wood veneer sheet 12 is bonded to a fibrous web 13 which may be either a relatively strong paper such as kraft paper or a mat of non-woven textile fibers. To provide a suitable background, it is advisable to use a web 13 which has a color approximating the color of the wood veneer sheet 12.

The fibrous web 13, in turn, is bonded to a thermoplastic film 14 which is preferably opaque and is stained to match the color of the wood veneer sheet 12. The film 14 can be a resin such as polyvinyl chloride, polyethylene, polypropylene, polyester, polyvinylidene chloride, or the like suitably opacified. The thickness of this film is usually on the order of 0.03 millimeter.

A metal foil 15 is adhesively bonded to the thermoplastic film 14 and has a thickness of about 0.015 millimeter. Aluminum foil, copper foil, or tin foil can be used for this purpose.

A second opaque thermoplastic film 16 is bonded to the underside of the metal foil 15, the thickness of the film 16 being on the order of about 0.03 millimeter, and being composed of the type of material of which the other opaque thermoplastic film 14 is composed.

The bottom ply of the laminated assembly is a fibrous web 17 composed of paper or a non-woven mat of textile fiber. This paper sheet may be of the same character as the web 13 and of the same thickness, namely, from about 0.01 to about 0.05 millimeter.

The various layers are secured together with a suitable adhesive, although the same adhesive need not be employed for securing all of the layers together. Suitable adhesives include such materials as phenolic resins, resorcinol resins, furan resins, urea-melamine resins, polyesters, polyurethanes, epoxy resins, polyethylene, polyvinyl chloride, butyl resins, polyvinyl acetate, polyvinyl alcohol, polyvinyl butyral, polyacrylic esters, butadiene acrylonitrile resins, neoprene, or other resinous solutions or emulsions, For securing the synthetic resin films with the metal foil, it is recommended that solvent type or emulsion type adhesives be used.

For setting the resins, any suitable heating method may be employed such as direct heat, steam heat, dielectric heating, or infrared heating.

The thermoplastic films 14 and 16 prevent the metal foil 15 from becoming oxidized by the air. They also prevent interaction between the metal foil 15 and the wood veneer sheet 12. The metal foil 15 adds a substantial amount of flexibility to the laminate.

It should be evident that various modifications can be made to the described embodiment without departing from the scope of the present invention.

I claim as my invention:

1. A laminated sheet comprising seven plies bonded together into a coherent structure, said seven plies being in the following order (1) a transparent thermoplastic film, (2) a sheet of wood veneer, (3) a sheet of a fibrous web, (4) a thermoplastic film, (5) a metal foil, (6) a thermo plastic film and (7) a fibrous web.

2. The sheet of claim 1 in which the individual plies are secured to each other with a thermoplastic adhesive.

3. The sheet of claim 1 in which the individual plies are secured to each other with a thermo-setting adhesive.

4. The sheet of claim 1 in which the thermoplastic films (1), (4), and (6) are each selected from the group consisting of polyvinyl chloride, polyethylene, polypropylene, polyester resins, and polyvinylidene chloride.

5. The sheet of claim 1 in which each of said fibrous webs (3) and (7) is a paper web.

6. The sheet of claim 1 in which said metal foil is composed of a metal selected from the group consisting of aluminum, copper, and tin.

7. The sheet of claim 1 in which said transparent thermoplastic film has a thickness in the range from about 0.14 to about 0.20 millimeter.

8. The sheet of claim 1 in which the fibrous webs (3) and (7) each have a thickness in the range from about 0.01 to 0.05 millimeter.

9. The sheet of claim 1 in which the thermoplastic films (4) and (6) are opaque films.

10. The sheet of claim 1 in which the fibrous web (3) has a color approximating the color of the wood veneer.

References Cited

UNITED STATES PATENTS

| 2,003,752 | 6/1935 | Landt | 161—205 |
| 2,699,417 | 1/1955 | Repsher et al. | 161—220 |

JACOB H. STEINBERG, Primary Examiner

U.S. Cl.X.R.

161—214, 220, 232, 250